(12) United States Patent
Biyani et al.

(10) Patent No.: US 9,617,921 B2
(45) Date of Patent: Apr. 11, 2017

(54) THERMAL ACTUATOR INCLUDING FLUID WITH HIGH TEMPERATURE STABILITY

(71) Applicant: General Electric Company, Schenectady, NY (US)

(72) Inventors: Pramod Kumar Biyani, Greer, SC (US); Larry Neil Lewis, Scotia, NY (US); Carlos Miguel Miranda, Greer, SC (US); Slawomir Rubinsztajn, Ballston Spa, NY (US); Stanley Frank Simpson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 796 days.

(21) Appl. No.: 13/955,624

(22) Filed: Jul. 31, 2013

(65) Prior Publication Data

US 2015/0037140 A1   Feb. 5, 2015

(51) Int. Cl.

| | |
|---|---|
| *F01D 25/12* | (2006.01) |
| *F02C 9/18* | (2006.01) |
| *F02C 7/18* | (2006.01) |
| *F03G 7/06* | (2006.01) |
| *F01D 5/08* | (2006.01) |
| *F01D 11/00* | (2006.01) |
| *F16K 31/00* | (2006.01) |

(52) U.S. Cl.
CPC ............. *F02C 9/18* (2013.01); *F01D 5/082* (2013.01); *F01D 11/001* (2013.01); *F01D 25/12* (2013.01); *F02C 7/18* (2013.01); *F03G 7/06* (2013.01); *F16K 31/002* (2013.01); *F05D 2300/50212* (2013.01)

(58) Field of Classification Search
CPC ........ F01D 11/001; F01D 25/12; F01D 5/082; F02C 9/18; F03G 7/06; F16K 31/002
See application file for complete search history.

(56) References Cited

U.S. PATENT DOCUMENTS

| | | |
|---|---|---|
| 4,248,043 A | 2/1981 | Stewart, Sr. |
| 4,283,211 A | 8/1981 | Ehrlich et al. |
| 4,504,402 A | 3/1985 | Chen et al. |
| 4,505,953 A | 3/1985 | Chen et al. |
| 4,510,960 A | 4/1985 | Jennings et al. |
| 4,513,053 A | 4/1985 | Chen et al. |
| 7,219,687 B2 | 5/2007 | Vasquez et al. |
| 7,424,978 B2 | 9/2008 | Vasquez et al. |
| 2007/0028964 A1 | 2/2007 | Vasquez et al. |
| 2007/0130941 A1 | 6/2007 | Vasquez et al. |
| 2009/0096217 A1 | 4/2009 | Watson |
| 2010/0018207 A1 | 1/2010 | Juchymenko |
| 2011/0017196 A1 | 1/2011 | Bell et al. |
| 2011/0120669 A1 | 5/2011 | Hunt |
| 2011/0162384 A1* | 7/2011 | Langdon, II ......... F01D 17/085 60/782 |
| 2011/0226780 A1 | 9/2011 | Bell et al. |

(Continued)

*Primary Examiner* — Woody Lee, Jr.
(74) *Attorney, Agent, or Firm* — Ernest G. Cusick; Frank A. Landgraff

(57) ABSTRACT

A thermal actuator is provided and includes an expansion material disposed and configured to move a movable element from a first movable element position toward a second movable element position in accordance with an expansion condition of the expansion material. The expansion material includes an inorganic salt mixture or a metal oxide mixture.

14 Claims, 6 Drawing Sheets

(56) References Cited

U.S. PATENT DOCUMENTS

2011/0259544 A1   10/2011  Neti et al.
2013/0126003 A1*  5/2013  De Bruyker ............ H01L 23/34
                                                         137/13
2014/0102544 A1*  4/2014  Riley ...................... B23P 19/00
                                                         137/13

* cited by examiner

THERMAL ACTUATOR INCLUDING FLUID WITH HIGH TEMPERATURE STABILITY

BACKGROUND OF THE INVENTION

The subject matter disclosed herein relates to a thermal actuator and, more particularly, to a thermal actuator including fluid with high temperature stability.

Gas turbine engines are widely used in industrial and commercial operations. A typical gas turbine engine includes a compressor, one or more combustors and a turbine. The compressor imparts kinetic energy to the working fluid (e.g., air) to produce a compressed working fluid at a highly energized state. The compressed working fluid exits the compressor and flows to the combustors where it mixes with fuel and ignites to generate combustion gases having a high temperature and pressure. The combustion gases flow to the turbine where they expand to produce work. Consequently, the turbine is exposed to very high temperatures due to the combustion gases and, as a result, the various turbine components (such as the shroud assemblies, rotor assemblies, wheel space cavities, and the like) typically need to be cooled and/or supplied with purge air. Accordingly, there is a need to provide turbine cooling systems and methods.

BRIEF DESCRIPTION OF THE INVENTION

According to one aspect of the invention, a thermal actuator is provided and includes an expansion material disposed and configured to move a movable element from a first movable element position toward a second movable element position in accordance with an expansion condition of the expansion material. The expansion material includes an inorganic salt mixture or a metal oxide mixture.

According to another aspect of the invention, a thermal actuator is provided and includes an enclosure, a movable element coupled to the enclosure and configured to occupy first and second positions relative to the enclosure, the movable element being biased toward the first position and an expansion material disposed within the enclosure such that, when the expansion material expands, the expansion material moves the movable element toward the second position. The expansion material includes an inorganic salt mixture or a metal oxide mixture.

According to yet another aspect of the invention, a turbine assembly is provided and includes rotor and stator assemblies positioned adjacent to one another to define a wheel space cavity, fixed and adjustable orifices respectively associated with the stator assembly to provide to the wheel space cavity a flow of purge air and an adjustable flow of cooling air, respectively, and a flow control device comprising an expansion material configured to vary the adjustable flow of cooling air to the wheel space cavity by varying a size of the adjustable orifice in accordance with an expansion condition of the expansion material. The expansion material includes an inorganic salt mixture or a metal oxide mixture.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Gas turbine engine cooling systems often include thermal actuators that respond to high temperatures within gas turbine engines by opening cooling system passages to permit coolant flow. This coolant flow removes heat from turbine components and provides for the necessary cooling. The thermal actuators may include an expansion medium that can be employed in hot sections of gas turbine engines where temperatures do not exceed about 398-400° C. Examples of the expansion medium include:

TABLE 1

| Commercial name | Composition | Upper use temperature |
| --- | --- | --- |
| Paratherm ™ HR | Synthetic alkylated-aromatic based | 371° C./700° F. |
| Paratherm ™ NF | Mineral oil based | 343° C./650° F. |
| Therminol ™ 66 | Modified terphenyl and polyphenyls | 343° C./650° F. |
| Therminol ™ VP-1 | Biphenyloxide | 400° C./750° F. |
| Syltherm ™ XLT | Polysiloxane | 260° C./500° F. |
| Syltherm ™ 800 | Polysiloxane Stabilized HFT | 400° C./750° F. |
| Duratherm ™ S | Polysiloxane | 343° C./650° F. |

As temperatures rise above 398-400° C., however, even the most thermally stable organic fluids undergo decomposition. This decomposition may lead to thermal actuator malfunctions. Moreover, since new generations of gas turbine engines are often designed to work at temperatures up to at least 649° C. and above to exhibit improved efficiencies, the limited thermal stabilities of the above-mentioned fluids leads to the result that they are often unsuitable for use in thermal actuators of gas turbine engines.

Figure 1:
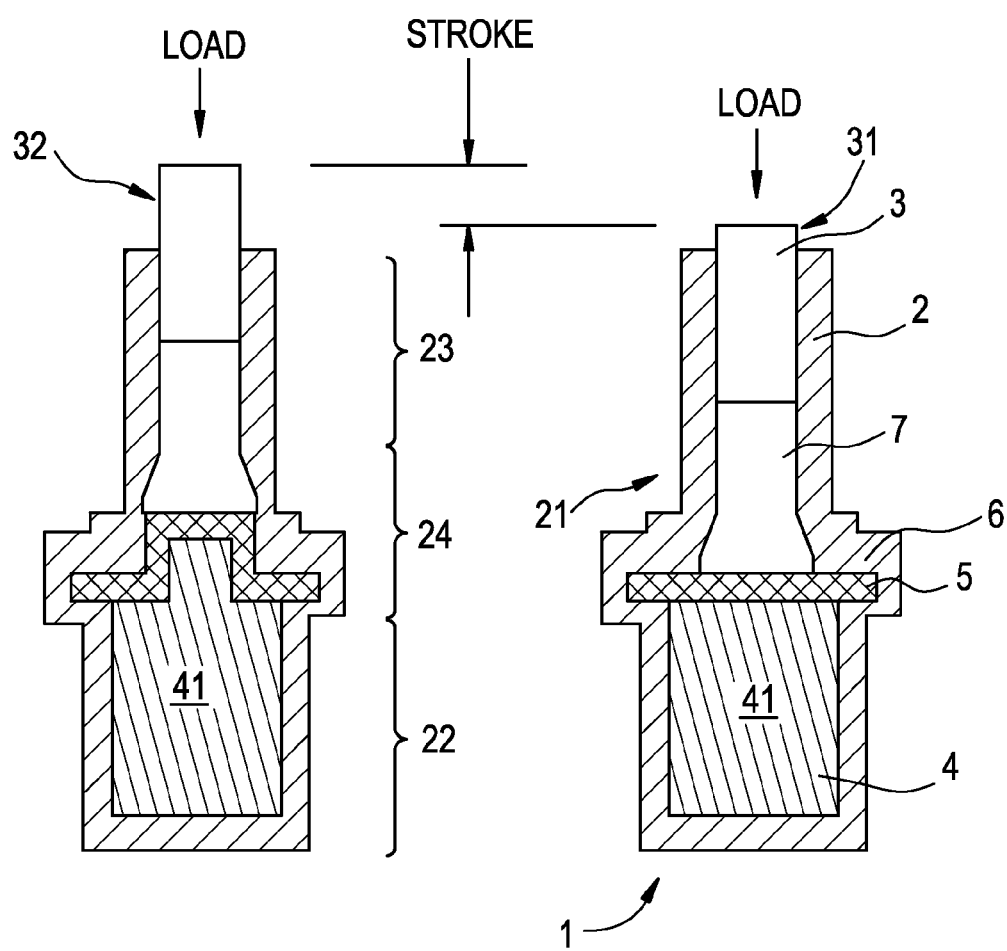
FIG. 1 is a side view of a thermal actuator in accordance with exemplary embodiments.

With reference to FIG. 1, an exemplary embodiment of a thermal actuator 1 is provided. The thermal actuator 1 includes an enclosure 2, a movable element 3 and an expansion material 4. The enclosure 2 may be a generally elongate element 21 having a closed end 22, an open end 23 and a central section 24 disposed between the closed end 22 and the open end 23. In accordance with embodiments, the open end 23 may be substantially elliptical, circular or polygonal in cross-sectional shape. The movable element 3 is coupled to the enclosure 2 and disposed to be movable within the open end 23 such that the movable element 3 is configured to occupy a first position 31 (i.e., the "cold" side of FIG. 1) and a second position 32 (i.e., the "hot" side of FIG. 1) relative to the open end 23. A distance between the first position 31 and the second position 32 is defined as the stroke of the thermal actuator 1 and is variable in accordance with various applications and design considerations.

A cross-sectional shape of the movable element 3 may be but is not required to be similar to that of the open end 23. The movable element 3 may also be biased toward one of the first position 31 or the second position 32. The bias applied to the movable element 3 may be provided by a load generated by, e.g., compressor extraction air in accordance with the embodiments of FIGS. 2-6 as will be described below.

The expansion material 4 is disposed generally within the closed end 22 of the enclosure 2. In this position, when the expansion material 4 expands or contracts due to the presence of high or low temperature fluid surrounding the enclosure 2, the expansion material 4 causes a movement of the movable element 3 toward the second position 32 in opposition to any bias applied to the movable element 3. The expansion material 4 includes an ingredient mixture 41 that is provided in a single chemical composition that solidifies at a lower temperature than any other composition made up of the ingredient mixture 41. In that sense, the expansion material 4 may include an inorganic salt mixture or a metal oxide mixture or, more particularly, an inorganic salt mixture in a eutectic composition.

In accordance with embodiments, the expansion material 4 has relatively high thermal stability as a fluid in the thermal actuator 1. Where the thermal actuator 1 is provided for use in a gas turbine engine that is expected to operate at temperatures well above about 398-400° C. or higher, the expansion material 4 may include inorganic compounds such as metal salts, their mixtures as well as potentially some low melting metal oxides and their mixtures. These classes of materials have melting points in a wide temperature range from about 20 to about 1000° C. In some embodiments, the materials have melting points below about 600° C. and in further embodiments, the materials have melting points below about 500° C.

In greater detail, the expansion material 4 may have a volumetric coefficient of thermal expansion (VCTE) in the molten state that is significantly higher than the VCTE of steel (VCTE of Inconel—38 10^-6 1/K, Hastelloy C—34 10^-6 1/K). That is, in accordance with embodiments, the VCTE of the expansion material 4 may be above 100 10^-6 1/K. In accordance with further embodiments, the VCTE of the expansion material 4 may be above 120 10^-6 1/K and, in accordance with further embodiments, the VCTE of the expansion material 4 may be above 180 or 220 10^-6 1/K. In addition, it will be understood that the expansion material 4 should exhibit good thermal stability, low toxicity and a relatively low tendency to cause corrosion of high quality alloys (e,g, Inconel, Hastelloy C) when heated in an oxygen and moisture free environment.

In accordance with still further embodiments, the expansion material 4 has a melting point in the range from about 50° C. to about 600° C., a VCTE above 120 10^-6 1/K in a molten state and is thermally stable above 450° C.

Examples of the expansion material 4 include:

TABLE 2

| Name | Composition | Upper temperature | Melting Point [C.] | Volumetric CTE [10^-6 1/K] |
|---|---|---|---|---|
| Hitec ™ Salt | Potassium nitrate, sodium nitrite and sodium nitrate | 538° C./1000° F. | 142 | 310 |
| Hitec ™ Solar | Potassium nitrate and sodium nitrate | 565° C./1050° F. | 220 | 340 |
| Dynalene ™ MS-1 | Potassium nitrate and sodium nitrate | 565° C./1050° F. | 225 | 307 |
| Dynalene ™ MS-2 | Potassium nitrate, lithium nitrate and sodium nitrate | 485° C./905° F. | 130 | 369 |
| Saltstream ™ 500 | Potassium nitrate, lithium nitrate, cesium nitrate, calcium nitrate and sodium nitrate | 500° C./932° F. | 65 | |
| Saltstream ™ 565 | Primarily nitrates | 565° C./1050° F. | 246 | 378 |
| Saltstream ™ 700 | Primarily Chlorides | 700° C./1292° F. | 257 | 282 |
| Haloglass ™ CK | Stable Oxides | 1200° C./2192° F. | 400 | |
| Boron Trioxide | B2O3 | 1200° C./2192° F. | 450 | 260 |

To the extent that the open end 23 of the enclosure 2 defines a linear region in which the movable element 3 is disposed, the movement of the movable element 3 may be substantially linear. However, this is not required and it is to be understood that embodiments exist in which the movement of the movable element 3 is non-linear as well. Similarly, a relationship between the distance traveled by the movable element 3 due to the expansion condition of the expansion material 4 and the expansion of the expansion material 4 may be linear or proportional.

In accordance with embodiments, a diaphragm 5 may be disposed between the movable element 3 and the expansion material 4 in the central section 24 of the elongate element 21. The diaphragm 5 may be affixed, fastened or adhered to the enclosure 2. Alternatively, as shown in FIG. 1, the enclosure 2 may include shoulder portions 6 formed to constrain a movement of the diaphragm 5. A plug 7 may also be provided between the diaphragm 5 and the movable element 3. The plug 7 may be formed of compliant material that deforms in accordance with the expansion condition of the expansion material 4 as shown in FIG. 1.

The thermal actuator 1 of FIG. 1 may be employed in various industries and applications. As an example, with reference to FIGS. 2-6, the thermal actuator 1 may be employed in a gas turbine engine for directing an adjustable flow of cooling air to a wheel space cavity and/or a stator cavity. Also, it is to be understood that the thermal actuator 1 illustrated in FIG. 1 is but one exemplary type of a thermal actuator, which may be referred to as a "diaphragm-based actuator," and which could potentially be used in the inorganic salt or metal oxides approached defined herein. Other types of thermal actuators, such as bellows-based actuators, could also be designed using this thermal fluid approach as well.

Figure 2:
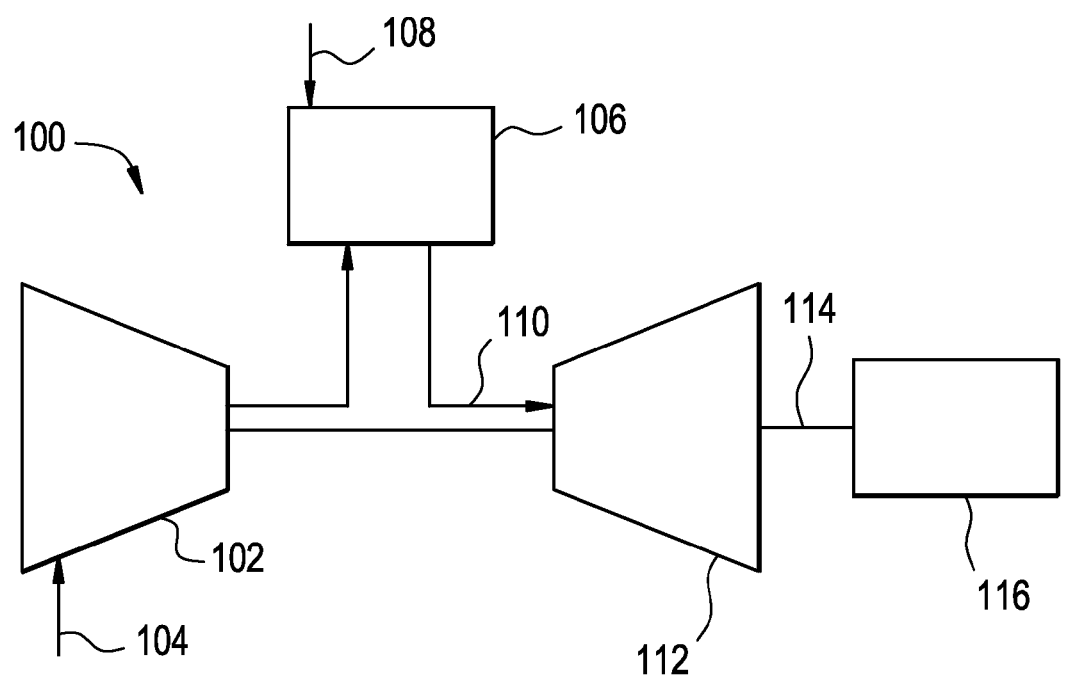
FIG. 2 is an example schematic view of a gas turbine engine according to embodiments.

FIG. 2 depicts an example schematic view of a gas turbine engine 100. The gas turbine engine 100 may include a gas turbine having a compressor 102. The compressor 102 compresses air 104 and is configured to subsequently deliver the compressed air 104 to a combustor 106. The combustor 106 mixes the compressed flow of air 104 with a pressurized flow of fuel 108 and ignites the mixture to create a flow of combustion gases 110. Although only a single combustor 106 is shown, the gas turbine engine 100 may include any number of combustors 106. The flow of combustion gases 110 may be delivered to a turbine 112 such that the flow of combustion gases 110 drives the turbine 112 to produce mechanical work. The mechanical work may drive the compressor 102 via a shaft 114 and an external load 116, such as an electrical generator or the like.

Figure 3:
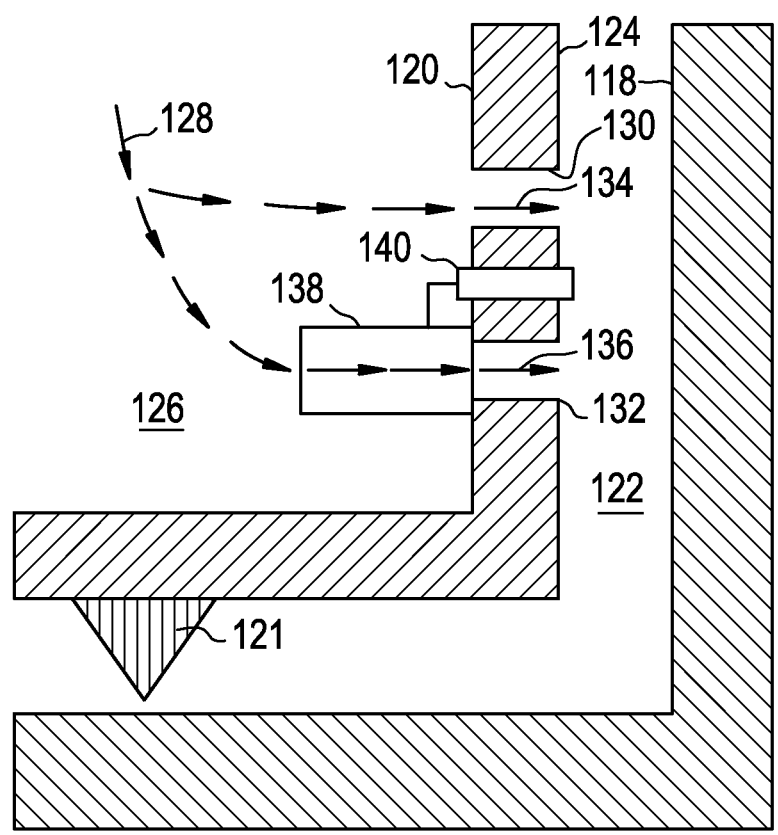
FIG. 3 is an example schematic cross-sectional view of a system for providing a flow of purge air and an adjustable flow of cooling air to a wheel space cavity according to embodiments.

As shown in FIG. 3, the turbine 112 may include a rotor assembly 118 and a stator assembly 120. The stator assembly 120 may be positioned adjacent to the rotor assembly 118 to define a wheel space cavity 122 between the rotor assembly 118 and the stator assembly 120. In some instances, an inter-stage seal 121 may be positioned between the rotor assembly 118 and the stator assembly 120. The stator assembly 120 may include a stator wall 124. That stator wall 124 may define a stator cavity 126 therein, which may be communicative with a flow of compressor extraction air 128. The flow of compressor extraction air 128 may at least partially fill the stator cavity 126.

A fixed purge air orifice 130 and an adjustable cooling air orifice 132 may be positioned in the stator wall 124. The fixed purge air orifice 130 may be configured to provide a flow of purge air 134 to the wheel space cavity 122, and the adjustable cooling air orifice 132 may be configured to provide an adjustable flow of cooling air 136 to the wheel space cavity 122. For example, the flow of compressor extraction air 128 may enter the stator cavity 126 and a first portion (i.e., the flow of purge air 134) thereof may pass through the fixed purge air orifice 130 and a second portion (i.e., the adjustable flow of cooling air 136) thereof may pass through the adjustable cooling air orifice 132. The flow of purge air 134 may purge the wheel space cavity 122, and the adjustable flow of cooling air 136 may cool the rotor assembly 118.

In some instances, a flow control device 138 such as the thermal actuator 1 of FIG. 1 may be positioned within the stator cavity 126. The flow control device 138 may also be associated with the adjustable cooling air orifice 132 and configured to vary the flow of cooling air 136 to the wheel space cavity 122. In one example, the flow control device 138 may vary the flow of cooling air 136 to the wheel space cavity 122 by varying the size of the adjustable cooling air orifice 132. In other instances, the flow control device 138 may include a valve-type mechanism or actuator associated with the adjustable cooling air orifice 132 for varying the flow of cooling air 136 to the wheel space cavity 122.

In certain embodiments, a temperature sensor 140 may be associated with the wheel space cavity 122 and/or the stator assembly 120. The temperature sensor 140 may be part of the flow control device 138 or a separate component. The temperature sensor 140 and/or actuator may be in communication with the flow control device 138 and may be mounted to the stator wall 124 to at least partially protrude into the wheel space cavity 122. Depending on the temperature of the wheel space cavity 122, the stator assembly 120 and/or the rotor assembly 118 (as determined by the temperature sensor 140) the flow control device 138 may increase or decrease the flow of cooling air 136 entering the wheel space cavity 122 via the adjustable cooling air orifice 132 by way of a temperature dependent actuator or the like. However, in certain embodiments, regardless of the temperature of the wheel space cavity 122, the fixed purge air orifice 130 may provide a constant metered flow of purge air 134 to the wheel space cavity 122.

Figure 4:
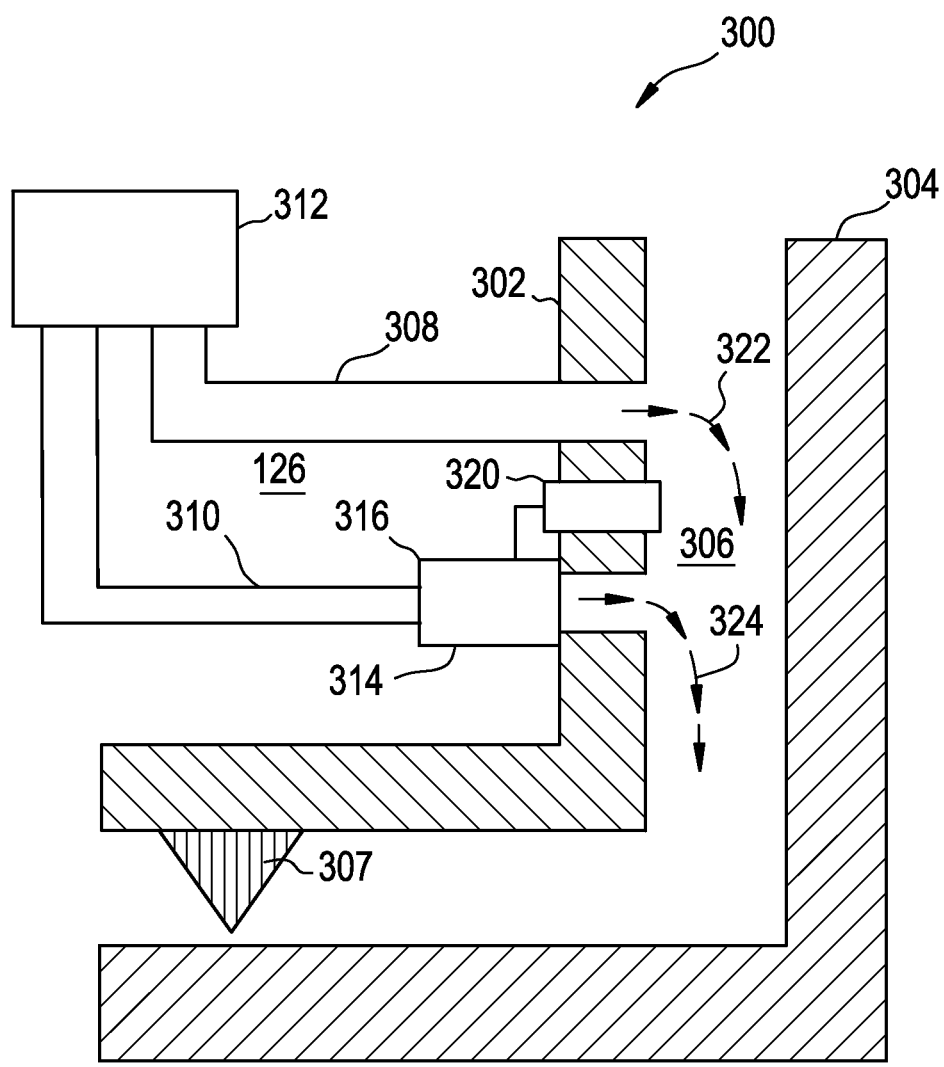
FIG. 4 is an example schematic cross-sectional view of a system for providing a flow of purge air and an adjustable flow of cooling air to a wheel space cavity according to embodiments.

FIG. 4 schematically depicts a system 300 for providing a flow of purge air 322 and an adjustable flow of cooling air 324 to a wheel space cavity 306. For example, the system 300 may include a stator assembly 302 positioned adjacent to a rotor assembly 304. The wheel space cavity 306 may be formed between the rotor assembly 304 and the stator assembly 302. In some instances, an inter-stage seal 307 may be positioned between the rotor assembly 304 and the stator assembly 302.

The stator assembly 302 may include at least one purge air circuit 308 and at least one cooling air circuit 310. Both the purge air circuit 308 and the cooling air circuit 310 may be in communication with the wheel space cavity 306 and a flow of compressor extraction air 312. In some instances, a flow control device 314 such as the thermal actuator 1 of FIG. 1 may be associated with the cooling air circuit 310 and configured to vary the flow of cooling air to the wheel space cavity 306. For example, the flow control device 314 may include a valve 316 in communication with the cooling air circuit 310. In this manner, the cooling air circuit 310 may include a flow circuit that directs a flow of compressor extraction air 312 through a tube or pipe to the wheel space cavity 306. The valve 316 may modulate the cooling flow to the wheel space cavity 306 by responding to the wheel space, stator assembly, and/or rotor assembly temperature as measured by one or more monitoring instruments, such as a temperature sensor 320 in communication with the valve 316. In some instances, the temperature sensor 320 and/or an actuator may be in communication with the valve 316 and may be mounted to the stator wall and at least partially protrude into the wheel space cavity 306. In some instances, the valve 316 may be disposed external to the gas turbine engine.

As described above, the fixed purge air orifice 130 (e.g., holes) of FIG. 3 and/or the purge air circuit 308 of FIG. 4 are fixed and sized to provide the required flow of purge air 134 or 322 to meet purge requirements in the wheel space cavity 122 in FIGS. 3 and 306 in FIG. 4. The rotor cooling flow of cooling air 136 or 324 provided by the adjustable cooling air orifice 132 of FIG. 3 and/or the cooling air circuit 310 of FIG. 4 may be modulated. For example, during cold ambient conditions, less cooling air 136 or 324 is required to maintain the wheel space cavity temperature. In this case, the flow control device 138, 314 may restrict or stop the flow of cooling air 136 or 324. During hot ambient conditions, more cooling air 1136 or 324 may be required to maintain the wheel space cavity temperature under the design limit. Under these conditions, the flow control device 138, 314 may allow more flow of cooling air 136 or 324. Accordingly, the flow control device 138, 314 may respond directly to the wheel space cavity temperature and adjust the flow of cooling air 136 or 324 as required to maintain rotor temperature within design limits. Having a variable flow area and the ability to vary the effective flow area of the cooling circuit, provides the additional benefit of improving back flow margin.

Any number of fixed and/or variable holes and/or circuits may be used herein. The fixed and/or variable holes and/or circuits may be any size, shape, and/or configuration. Moreover, the variable flow holes and/or circuits do not necessarily have to operate in unison. That is, some may open and some may close. In addition, the variable flow holes and/or circuits may be adjusted in response to any parameter, such as, but not limited to, temperature, power output, ambient conditions, cost, etc.

Figure 5:
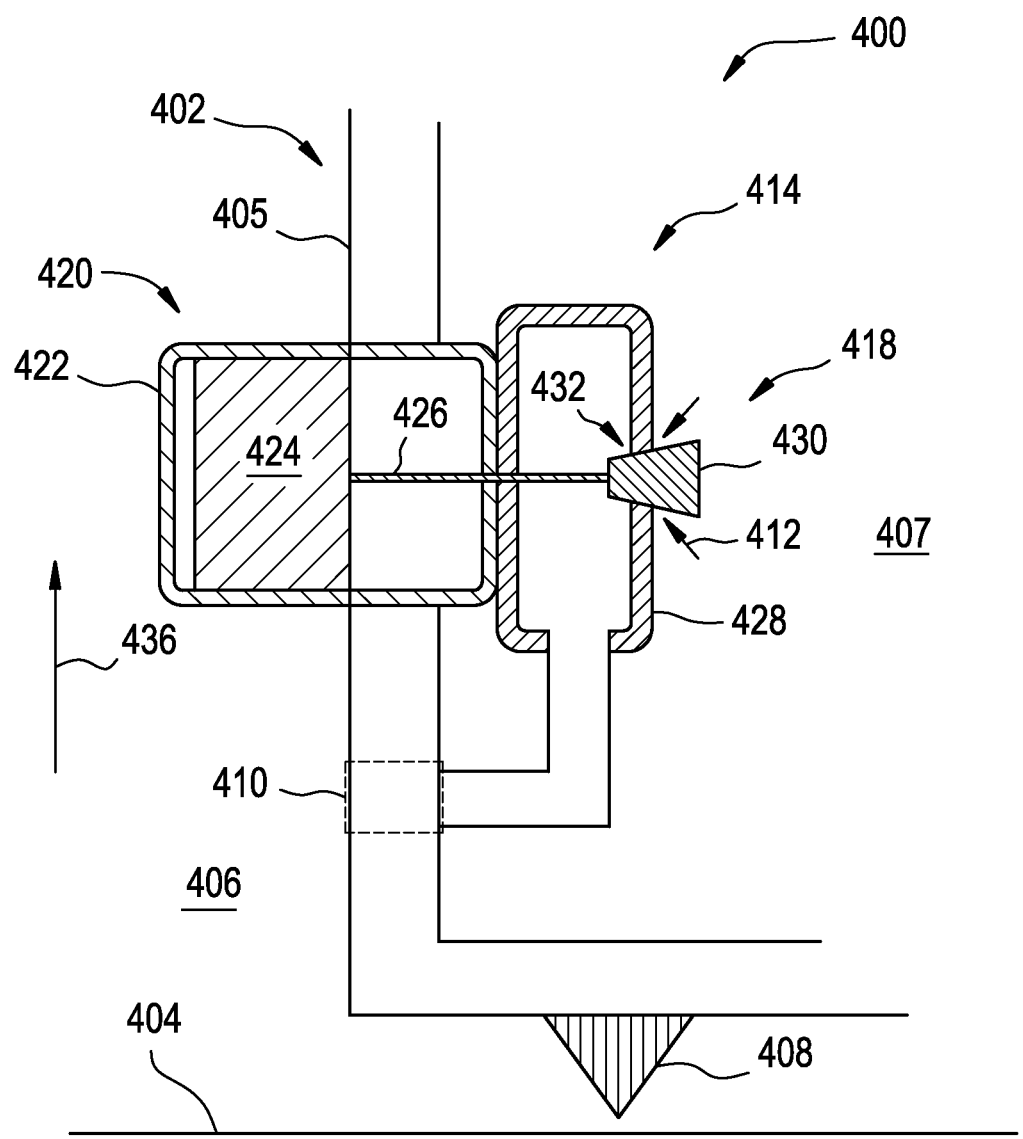
FIG. 5 is an example schematic cross-sectional view of a system for providing an adjustable flow of cooling air to a wheel space cavity according to embodiments.
Figure 6:
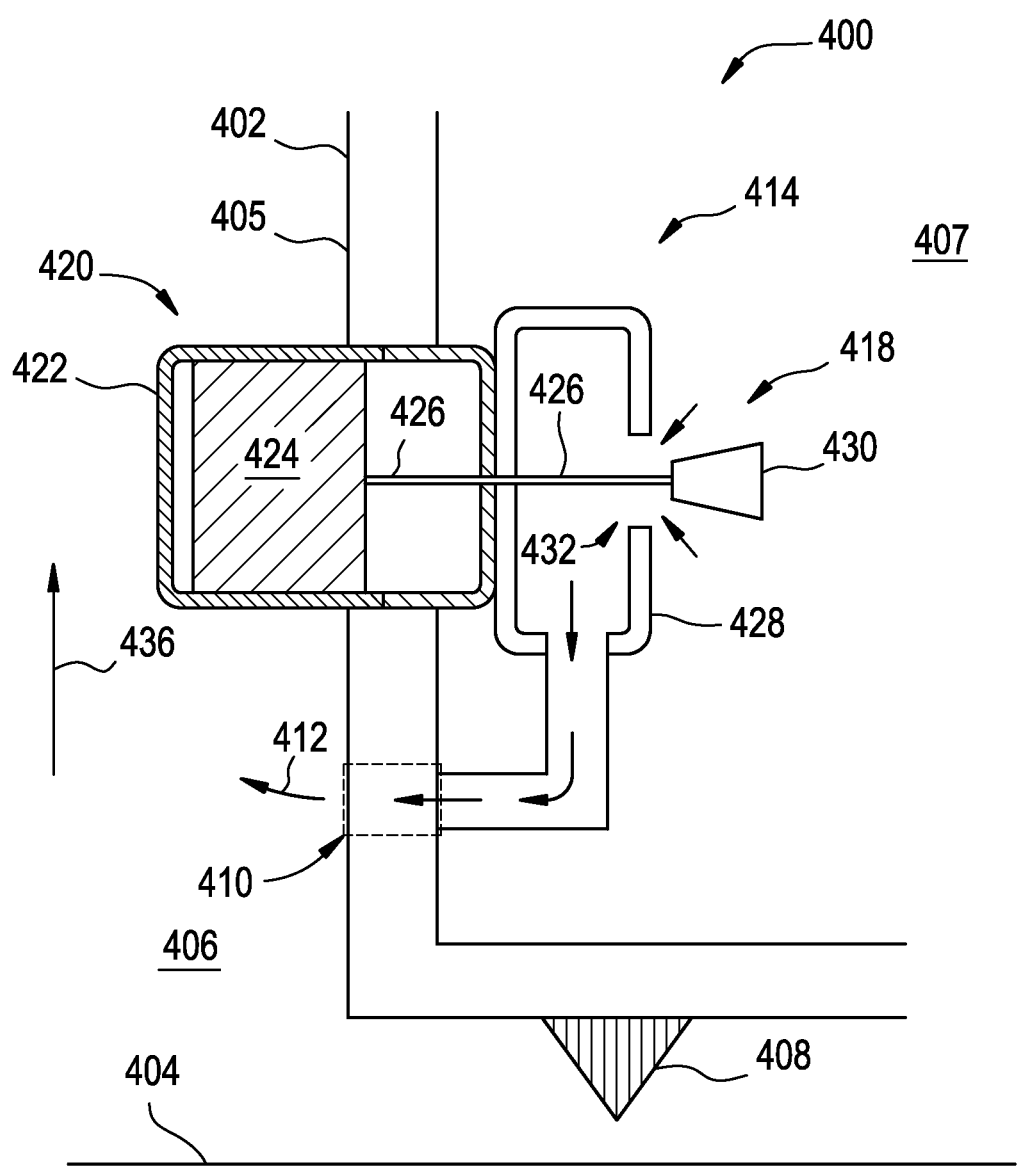
FIG. 6 is an example schematic cross-sectional view of a system for providing an adjustable flow of cooling air to a wheel space cavity according to embodiments.

FIGS. 5 and 6 schematically depict an example cross-sectional view of a system 400 for providing an adjustable flow of cooling air to a wheel space cavity 406. For example, the system 400 may include a stator assembly 402 positioned adjacent to a rotor assembly 404. The stator assembly 402 may include a stator wall 405 that defines a stator cavity 407. The wheel space cavity 406 may be formed between the rotor assembly 404 and the stator assembly 402. In some instances, an inter-stage seal 408 may be positioned between the rotor assembly 404 and the stator assembly 402.

In certain embodiments, the system 400 may be configured to sense, control, and/or modulate the temperature within wheel space cavity 406 by increasing or decreasing an adjustable flow of cooling air 412 to the wheel space cavity 406. For example, the system 400 may include at least one cooling air passage 410 configured to provide the adjustable flow of cooling air 412 to the wheel space cavity 406 from the stator cavity 407. The cooling air passage 410 may include any opening or passage between the stator cavity 407 and the wheel space cavity 406. The adjustable flow of cooling air 412 provided to the wheel space cavity 406 by the cooling air passage 410 may be controlled by a flow control device 414. In this manner, the flow control device 414 may include the thermal actuator 1 of FIG. 1 and may be associated with the cooling air passage 410, but not necessarily positioned within the cooling air passage 410, so as to modulate the adjustable flow of cooling air 412 provided to the wheel space cavity 406 by the cooling air passage 410. In some instances, portions of the flow control device 414 may be mounted to the stator wall 405.

In order to control the adjustable flow of cooling air 412 provided to the wheel space cavity 406 by the cooling air passage 410, the flow control device 414 may include a valve 418 that is configured to open and close, thereby increasing or decreasing the adjustable flow of cooling air 412 provided to the wheel space cavity 406 by the cooling air passage 410. For example, as depicted in FIG. 5, the valve 418 is in the closed position, thereby preventing and/or limiting the adjustable flow of cooling air 412 from entering the wheel space cavity 406. Conversely, as depicted in FIG. 6, the valve 418 is in the open position, thereby enabling the adjustable flow of cooling air 412 to enter the wheel space cavity 406.

In certain embodiments, a temperature dependent actuator 420 (e.g., the thermal actuator 1 of FIG. 1) may be in mechanical communication with the valve 418. The temperature dependent actuator 420 may be configured to open and close the valve 418. For example, the temperature dependent actuator 420 may be positioned at least partially within the wheel space cavity 406 so as to be at least partially exposed to the wheel space cavity 406. In this manner, the temperature dependent actuator 420 may sense and/or react to the temperature within the wheel space cavity 406. In response, the temperature dependent actuator 420 may open or close the valve 418 to regulate the temperature within the wheel space cavity 406. In certain embodiments, the temperature dependent actuator 420 may include an actuator housing 422. In some instances, the actuator housing 422 may be positioned at least partially within the wheel space cavity 406 and/or at least partially within the stator cavity 407. That is, the actuator housing 422 may be at least partially exposed to the wheel space cavity 406. In addition, a temperature dependent element 424 (e.g., the expansion material 4 of FIG. 1) may be positioned within the actuator housing 422. The temperature dependent element 424 may be configured to expand or contract in response to a temperature of the wheel space cavity 406. For example, as the temperature dependent element 424 expands, it may push a rod 426 (e.g., the movable element 3 of FIG. 1 or another mechanical linkage) attached to the valve 418, thereby opening the valve 418 and allowing the adjustable flow of cooling air 412 to enter the wheel space cavity 406 by way of the cooling air passage 410. Conversely, as the temperature dependent element 424 contracts, it may pull the rod 426 (or other mechanical linkage) attached to the valve 418, thereby closing the valve 418 and preventing or limiting the adjustable flow of cooling air 412 from enter the wheel space cavity 406 by way of the cooling air passage 410.

In some instances, the valve 418 may include a valve body 428 and a valve disc 430. For example, the valve body 428 may include an opening 432 to the stator cavity 407, and the valve disc 430 may be configured to open and close the opening 432. That is, the valve disc 430 may be configured to open or close in response to the temperature dependent actuator 420 expanding or contracting. In this manner, the position of the valve disc 430 about the opening 432 may determine the adjustable flow of cooling air 412 that is provided to the wheel space cavity 406 by the cooling air passage 410.

In certain embodiments, the cooling air passage 410 may be positioned upstream of the temperature dependent actuator 420 so as to deliver the adjustable flow of cooling air 412 upstream of the temperature dependent actuator 420. That is, the fluid flow 436 within the wheel space 406 may be radially outward. In certain embodiments, the flow control device 414 may not be directly mounted to the cooling air passage 410.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermal actuator, comprising:
   an enclosure comprising shoulder portions;
   a movable element coupled to the enclosure and configured to occupy first and second positions relative to the enclosure, the movable element being biased toward the first position; and
   an expansion material disposed within the enclosure such that, when the expansion material expands, the expansion material moves the movable element toward the second position, the expansion material comprising an inorganic salt mixture, further comprising:
a diaphragm disposed between the movable element and the expansion material, the diaphragm being at least one of affixed, fastened or adhered to the shoulder portions of the enclosure to constrain movement of the diaphragm; and
a plug formed of compliant material disposed between the movable element and the diaphragm.

2. The thermal actuator according to claim 1, wherein the expansion material is eutectic.

3. The thermal actuator according to claim 1, wherein the expansion material has a melting point in the range from 50° C. to 600° C. and its volumetric coefficient of thermal expansion is above 180 $10^{-6}$ 1/K and is thermally stable above 450 C.

4. The thermal actuator according to claim 1, wherein the movable element is linearly movable.

5. A turbine assembly, comprising:
rotor and stator assemblies positioned adjacent to one another to define a wheel space cavity;
fixed and adjustable orifices respectively associated with the stator assembly to provide to the wheel space cavity a flow of purge air and an adjustable flow of cooling air, respectively; and
a flow control device comprising an expansion material configured to vary the adjustable flow of cooling air to the wheel space cavity by varying a size of the adjustable orifice in accordance with an expansion condition of the expansion material,
the expansion material comprising an inorganic salt mixture,
the thermal actuator further comprising:
a diaphragm disposed between the movable element and the expansion material;
an enclosure comprising shoulder portions, the diaphragm being at least one of affixed, fastened or adhered to the shoulder portions of the enclosure to constrain movement of the diaphragm; and
a plug formed of compliant material disposed between the movable element and the diaphragm.

6. The turbine assembly according to claim 5, wherein the expansion material is eutectic.

7. The turbine assembly according to claim 5, wherein the stator assembly comprises a stator wall formed to define a stator cavity communicable with a flow of compressor extraction air.

8. The turbine assembly according to claim 7, wherein the fixed and adjustable orifices are each positioned in the stator wall and the flow control device is positioned in the stator cavity.

9. The turbine assembly according to claim 7, wherein the flow of purge air and the adjustable flow of cooling air each comprise compressor extraction air.

10. The turbine assembly according to claim 5, further comprising a temperature sensor associated with the wheel space cavity and in communication with the adjustable orifice.

11. The turbine assembly according to claim 5, further comprising an inter-stage seal positioned between the rotor assembly and the stator assembly.

12. The turbine assembly according to claim 5, wherein the expansion material comprises a eutectic salt mixture.

13. The turbine assembly according to claim 5, wherein the expansion material has a melting point in the range from 50° C. to 600° C. and its volumetric coefficient of thermal expansion is above 180 $10^{-6}$ 1/K and is thermally stable above 450 C.

14. The turbine assembly according to claim 5, wherein the flow control device comprises a movable element that is linearly movable in accordance with the expansion condition of the expansion material.

* * * * *